(12) United States Patent
Ore-Yang

(10) Patent No.: US 10,983,599 B2
(45) Date of Patent: Apr. 20, 2021

(54) METHOD FOR MANUFACTURING KEYCAPS OF CAPPED KEYBOARD APPARATUS

(71) Applicant: Acrox Technologies Co., Ltd., Taipei (TW)

(72) Inventor: Steve Ore-Yang, Taipei (TW)

(73) Assignee: ACROX TECHNOLOGIES CO., LTD., Taipei (TW)

( * ) Notice: Subject to any disclaimer, the term of this patent is extended or adjusted under 35 U.S.C. 154(b) by 231 days.

(21) Appl. No.: 16/036,132

(22) Filed: Jul. 16, 2018

(65) Prior Publication Data

US 2019/0155399 A1 May 23, 2019

(30) Foreign Application Priority Data

Nov. 23, 2017 (TW) .................... 106140806

(51) Int. Cl.
| | |
|---|---|
| *B29C 51/10* | (2006.01) |
| *G06F 3/02* | (2006.01) |
| *H01H 13/704* | (2006.01) |
| *H01H 13/705* | (2006.01) |
| *H01H 13/88* | (2006.01) |
| *H01H 13/83* | (2006.01) |
| *B29C 51/12* | (2006.01) |
| *B29C 51/14* | (2006.01) |
| *H01H 9/18* | (2006.01) |

(52) U.S. Cl.
CPC ............ *G06F 3/0202* (2013.01); *B29C 51/10* (2013.01); *B29C 51/12* (2013.01); *B29C 51/14* (2013.01); *B29C 51/145* (2013.01); *H01H 13/704* (2013.01); *H01H 13/705* (2013.01); *H01H 13/83* (2013.01); *H01H 13/88* (2013.01); *H01H 2009/187* (2013.01); *H01H 2209/002* (2013.01); *H01H 2209/014* (2013.01); *H01H 2219/056* (2013.01); *H01H 2229/00* (2013.01); *H01H 2229/01* (2013.01)

(58) Field of Classification Search
None
See application file for complete search history.

(56) References Cited

U.S. PATENT DOCUMENTS

| 3,149,018 | A | * | 9/1964 | Jacobson | ................ B29C 51/16 |
| | | | | | 428/68 |
| 5,098,633 | A | * | 3/1992 | Hausler | ............. B29C 45/14688 |
| | | | | | 264/132 |
| 5,376,314 | A | * | 12/1994 | Share | ..................... H01H 9/182 |
| | | | | | 264/132 |
| 5,399,821 | A | * | 3/1995 | Inagaki | ............... B29C 45/1418 |
| | | | | | 200/302.2 |
| 5,633,022 | A | * | 5/1997 | Myers | ..................... B29C 51/40 |
| | | | | | 264/509 |

(Continued)

*Primary Examiner* — Edmund H Lee
(74) *Attorney, Agent, or Firm* — Volpe Koenig

(57) ABSTRACT

A method for manufacturing keycaps of a capped keyboard apparatus is disclosed. The proposed method includes: (a) providing a cover layer and plural keycap main bodies, wherein the cover layer includes plural units, and each the unit has an upper surface with a character; (b) putting the plural keycap main bodies on a fixture; (c) shaping the cover layer on the fixture and attaching each the unit to a corresponding one of the plural keycap main bodies; and (d) cutting the cover layer to obtain plural keycaps independent of one another.

10 Claims, 10 Drawing Sheets

(56) References Cited

U.S. PATENT DOCUMENTS

| | | | | |
|---|---|---|---|---|
| 5,681,515 | A * | 10/1997 | Pratt | B29C 45/14 |
| | | | | 264/138 |
| 5,807,002 | A * | 9/1998 | Tsai | H01H 13/705 |
| | | | | 200/311 |
| 6,621,027 | B1 * | 9/2003 | Shimizu | H01H 13/702 |
| | | | | 200/308 |
| 7,097,371 | B2 * | 8/2006 | Hasunuma | G06F 3/0202 |
| | | | | 200/341 |
| 9,691,569 | B2 * | 6/2017 | Chen | H01H 13/83 |
| 2011/0076455 | A1 * | 3/2011 | Lee | B29C 45/1671 |
| | | | | 428/161 |
| 2013/0248337 | A1 * | 9/2013 | Hu | H01H 9/02 |
| | | | | 200/304 |
| 2015/0016038 | A1 * | 1/2015 | Niu | B29C 70/78 |
| | | | | 361/679.09 |
| 2016/0086746 | A1 * | 3/2016 | Chen | H01H 13/023 |
| | | | | 362/23.03 |
| 2019/0013162 | A1 * | 1/2019 | Wang | G06F 3/0202 |

* cited by examiner

METHOD FOR MANUFACTURING KEYCAPS OF CAPPED KEYBOARD APPARATUS

CROSS-REFERENCES TO RELATED APPLICATIONS

This application claims the benefits of Taiwan Patent Application Number 106140806 filed on Nov. 23, 2017, at the Taiwan Intellectual Property Office, the disclosures of which are incorporated herein in their entirety by reference.

FIELD OF THE INVENTION

The present invention relates to a method for manufacturing keycaps of a capped keyboard apparatus, in particular to a method for manufacturing keycaps of a backlit keyboard including plural independent keycaps and plural independent cover layers.

BACKGROUND OF THE INVENTION

The backlit keyboards in the prior art are frequently adapted for use with notebook computers. When a backlit keyboard starts the backlight function in a dark place, the white LEDs inside the keyboard will emit a light and penetrate through the laser-carved character upon each keycap so that the characters on the keyboard can be seen clearly by the user. When in a bright place, the LEDs in the backlit keyboard will be turned off to save power. Thus, the backlit keyboard is good for operating at night or in a dark place. In contrast, a light cannot be emitted out from a non-backlit keyboard. However, in order to let characters formed by laser carving be penetrated by light and to prevent other parts of the keycap from being penetrated by light in a backlit keyboard, the keycap main body needs to be baked and varnished for up to as many as 10 layers so that no light can penetrate through and also be abrasion resistant. And then, the baking paint located upon the character on an upper surface of the keycap is removed by laser carving so that a light can be emitted out from the character.

However, the manufacturing procedure for baking and varnishing up to as many as 10 layers on the keycap main body involves a long manufacturing time and has high costs. Thus, how to improve this manufacturing procedure in the prior art to save the relative manufacturing costs and time and to cause a light emitted out from the character to be uniformly distributed are important aspects for development in the field.

Keeping the drawbacks of the prior art in mind, and through the use of robust and persistent experiments and research, the applicant has finally conceived of a method for manufacturing keycaps of a capped keyboard apparatus.

SUMMARY OF THE INVENTION

It is an objective of the present invention to provide a method for manufacturing keycaps of a capped keyboard apparatus with each of the plural keycaps configured on the keyboard having a relatively better texture and appearance than that of the keyboard apparatus in the prior art, and the relative manufacturing costs of the proposed keyboard is relatively lower than that of the backlit keyboard in the prior art because no baking varnish is required, the relative manufacturing time of the proposed keyboard is shorter than that of the backlit keyboard in the prior art, and a light emitted out from the character of the proposed keyboard is uniformly distributed.

In accordance with the first aspect of the present invention, a method for manufacturing keycaps of a capped keyboard apparatus comprises: (a) providing a cover layer and plural keycap main bodies, wherein the cover layer includes plural units, each the unit has a first surface and a second surface, each the keycap main body has a top surface, and the first surface of each the unit has a character denoting a corresponding keycap; (b) putting the plural keycap main bodies on a vacuum fixture; (c) shaping the cover layer on the vacuum fixture and causing the cover layer to be attached to the plural keycap main bodies for attaching the second surface of each the unit to the top surface of a corresponding keycap main body; and (d) cutting the cover layer to obtain plural keycaps respectively attaching thereto the plural units independent of one another.

In accordance with the second aspect of the present invention, a method for manufacturing keycaps of a capped keyboard apparatus comprises: (a) providing a cover layer and plural keycap main bodies, wherein the cover layer includes plural units, and each the units has an upper surface with a character; (b) putting the plural keycap main bodies on a fixture; (c) shaping the cover layer on the fixture by heating the cover layer first and then cooling the cover layer down, and attaching each the unit to a corresponding one of the plural keycap main bodies; and (d) cutting the cover layer to obtain plural keycaps independent of one another.

In accordance with the third aspect of the present invention, a method for manufacturing keycaps of a capped keyboard apparatus comprises: (a) providing a cover layer and plural keycap main bodies, wherein the cover layer includes plural units, and each the unit has an upper surface with a character; (b) putting the plural keycap main bodies on a fixture; (c) shaping the cover layer on the fixture and attaching each the unit to a corresponding one of the plural keycap main bodies; and (d) cutting the cover layer to obtain plural keycaps independent of one another.

BRIEF DESCRIPTION OF THE DRAWINGS

Other objectives, advantages and the efficacy of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of the preferred embodiments of this invention are presented herein for purposes of illustration and description only; they are not intended to be exhaustive or to be limited to the precise form disclosed.

Figure 1:
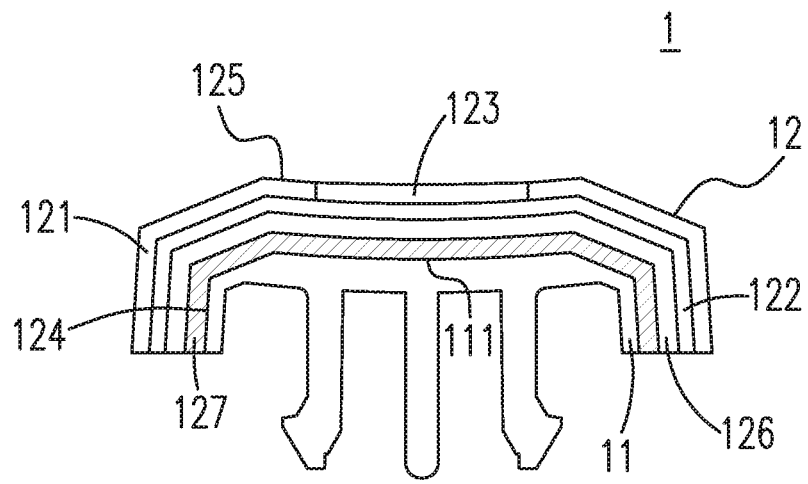
FIG. 1 is a sectional view diagram of a keycap according to the preferred embodiment of the present invention.

FIG. 1 shows a sectional view diagram of a keycap according to the preferred embodiment of the present invention. The capped keyboard apparatus proposed in the present invention includes plural independent keycaps and each the keycap includes a main body and a cover layer. In FIG. 1, the keycap 1 includes a main body 11 having a top surface 111, and a cover layer 12, wherein the cover layer 12 includes a shell fabric layer (or a light shield layer) 121, a base material layer (or an adhesion layer) 122, a thermoplastic layer (being of a first light divergence) 126 and an adhesive layer 127. The cover layer 12 at least covers the respective top surface 111 of the corresponding main body 11, wherein each the cover layer 12 has a lower surface 124 attached to the top surface 111 and an upper surface 125 (also an upper surface of the shell fabric layer 121), and a character (or a symbol) 123 is formed by a laser carving to fully remove the shell fabric layer 121 at the upper surface 125 whose area is vertically corresponding to that of the character 123 such that a light penetrates through the character 123. The character (or the symbol) 123 is located upon the top surface 111 when the cover layer 12 is attached to the main body 11, and the plural cover layers 12 of the keyboard are independent of one another.

The unique features of the present invention are: "After the shell fabric layer 121 goes through an alcohol abrasion test by being rubbed for at least 100 times, an abrasion test with a soft eraser by being rubbed for at least 100,000 times and an abrasion test with a hard eraser by being rubbed for at least 1,000 times, the shell fabric layer 121 is free from a peel-off (or a frame surrounding the character 123 remains intact after the three abrasion tests above)." Whether the shell fabric layer 121 can go through the three abrasion tests above without any peel-off depends on the size of the molecules, the thickness of the coating and the texture design. In general, when a molecule is larger, it is more abrasion resistant, and when the coating is thicker, it is also more abrasion resistant. For example, a skilled person in the field would know that when carbon black particles are added into the rubber to generate the reinforcing action to the rubber, the carbon black having larger particles would have better abrasion resistance. Likewise, a skilled person in the field would know that the composite floor includes transparent material (wear layer), printing shell fabric and base material. And, a thickness of the wear layer relates to the abrasion resistance of the floor. For example, plastic floor tiles with thicker wear layers have to be used in offices or entrances and exits of places with streams of people such as restaurants, department stores and storefronts in general. In addition, a skilled person in the field would know that when an automobile tire has a tread of lateral groove, its' driving force, brake force and traction force are excellent and its' abrasion resistance is good.

The alcohol abrasion test above is engaged in abrasion by using an alcohol pad, an alcohol concentration of the alcohol pad is one selected from a group consisting of 75%, 95% and 99%, the soft eraser is a CS-5 eraser, and the hard eraser is one of a EF74 eraser and a CS-10F eraser.

The alcohol abrasion test above includes a first experimental condition having a speed of 1 cycle/second, a distance of shifting back and forth of 20 mm and a load of 500 grains, and a first result of the experiment after being rubbed by an alcohol pad for at least 100 times, the shell fabric layer 121 is free from a peel-off (for example, the cover layer 12 is free from exposing the base material layer 122), a second experimental condition of the abrasion test with the soft eraser has a speed of 1 cycle/second, a distance of shifting back and forth of 20 mm, and a load of 200 grains, and a second result of the experiment after being rubbed for at least 100,000 times, the shell fabric layer 121 is free from a peel-off (for example, the cover layer 12 is free from exposing the base material layer 122), and a third experimental condition of the abrasion test with the hard eraser has a speed of 1 cycle/second, a distance of shifting back and forth of 20 mm and a load of 500 grams, and a third result of the experiment after being rubbed for at least 1,000 times, the shell fabric layer 121 is free from a peel-off (for example, the cover layer 12 is free from exposing the base material layer 122).

In FIG. 1, the shell fabric layer 121 is one selected from a group consisting of a leather, a fabric and a leatheroid, the leather has a softness, the fabric is one of a cloth with a base material of knitted fabric and a cloth processed material, and the leatheroid is one selected from a group consisting of a Polyurethane (PU) leather, a Polyvinyl Chloride (PVC) leather, a dry process PU leather of a PU shell fabric combined with a knitted fabric, a wet process PU leather of a PU shell fabric combined with a knitted fabric base, and a leatheroid of a PVC shell fabric combined with a knitted fabric.

As shown in FIG. 1, the keycap 1 includes the shell fabric layer 121 with a preferred embodiment of, for example, a PU shell fabric layer, the base material layer 122 with a preferred embodiment of, for example, a PU base material layer, the thermoplastic layer 126 with a preferred embodiment of, for example, a TPU thermoplastic layer, the adhesive layer 127 with a preferred embodiment of, for example, a PU hot melt adhesive layer. Each the cover layer 12 is formed by sequentially attaching the shell fabric layer 121, the base material layer 122, the thermoplastic layer 126 and the adhesive layer 127 from the top to the bottom.

Please refer to FIG. 1, when the keycap 1 is manufactured, the thermoplastic layer 126 included in the cover layer 12 is shaped after a heating, a vacuum forming and a cooling down, and further causes the cover layer 12 to be shaped onto the main body 11. The main body 11 and the cover layer 12 are adhesive to each other via the adhesive layer 127. The base material layer 122 is an adhesion layer to adhere together the shell fabric layer 121 and the thermoplastic layer 126. The base material layer 122 includes a transparent material, an opaque pigment and a light diffuser, the opaque pigment is mixed with the light diffuser and the transparent material in a specific mixing ratio to adjust a color of the character 123 seen by a naked eye.

Figure 2:
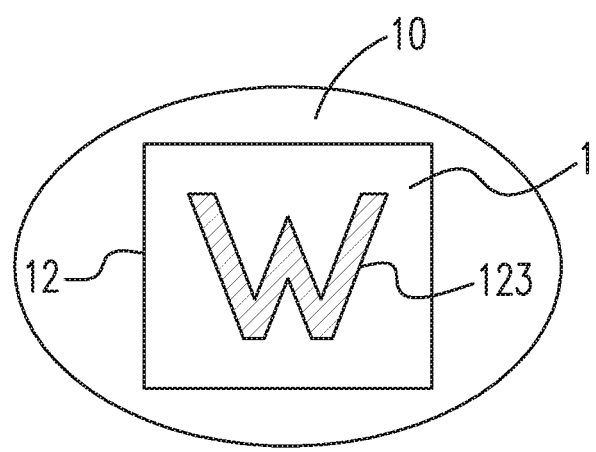
FIG. 2 is a top view diagram of a keycap of a keyboard according to the preferred embodiment of the present invention.

FIG. 2 shows a top view diagram of a keycap of a keyboard according to the preferred embodiment of the present invention. In FIG. 2, a specific keycap 1 of a keyboard 10 has a cover layer 12, and a character (or a symbol) "W" is formed on the cover layer 12 located on top of the keycap 1 and corresponding to the top surface 111 of the main body 11 (both 111 and 11 are not shown) after the shell fabric layer 121 thereon is removed by a laser carving according to a form of the character 123.

As shown in FIG. 1, the thermoplastic layer 126 is a light divergence layer of a first light divergence to adjust a light emission color of the light. Please refer to FIG. 2, the opaque pigment or the light diffuser has an effect of a second light divergence, a light emitted out from an inner portion of keyboard apparatus 10 is scattered, refracted or reflected due to the second light divergence formed by one of the opaque pigment and the light diffuser included in the base material layer 122 such that the light appears to be a uniform light band being more uniformly. The light emission color is adjusted in response to the first and second light divergences, and due to the light going through the thermoplastic layer 126 and the base material layer 122. The adhesive layer 127 (or the cover layer 12) further includes the bottom surface 124 attached to the main body 11.

Figure 3:
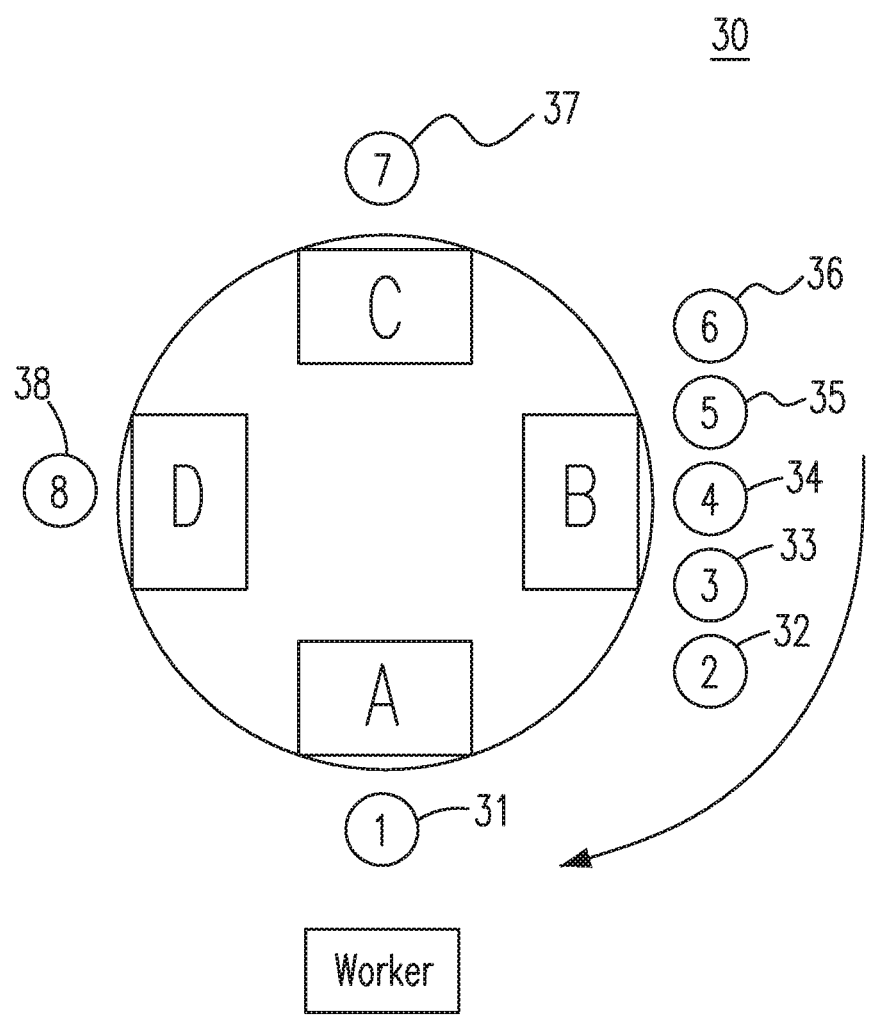
FIG. 3 is a schematic diagram of a machine for automatic production of keycaps according to the preferred embodiment of the present invention.

FIG. 3 shows a schematic diagram of a machine for automatic production of keycaps according to the preferred embodiment of the present invention. In FIG. 3, the machine 30 includes workstations A, B, C and D. The machine 30 rotates along the direction of the arrow. Among which, the workstation A includes station 1 (31), where the keycap main bodies are put on a bottom die, the workstation B includes station 2 (32), where a cover layer is sucked to an upper die, station 3 (33), where a heating apparatus moves in to heat the cover layer, station 4 (34), where the upper die and a bottom die are matched to fix the cover layer, station 5 (35), where the bottom die is vacuumized, and station 6 (36), where a cooling frame moves in to lower the temperature, the workstation C includes station 7 (37), where a cutting die is used to cut off the unwanted parts of the cover layer, and the workstation D includes station 8 (38), where the manufactured keycaps are taken down. The production activities of the workstations and the stations above are described in the following table.

descriptions of production activities

| workstations | sequence of stations | activities descriptions |
| --- | --- | --- |
| A | 1 | the keycap main bodies are put on a bottom die |
| B | 2 | a cover layer is sucked to an upper die |
|   | 3 | a heating apparatus moves in to heat the cover layer |

-continued descriptions of production activities

| workstations | sequence of stations | activities descriptions |
| --- | --- | --- |
|   | 4 | the upper die and the bottom die are matched to fix the cover layer |
|   | 5 | the bottom die is vacuumized |
|   | 6 | a cooling frame moves in to lower the temperature |
| C | 7 | a cutting die is used to cut off the unwanted parts of the cover layer |
| D | 8 | the manufactured keycaps are taken down |

Figure 4:
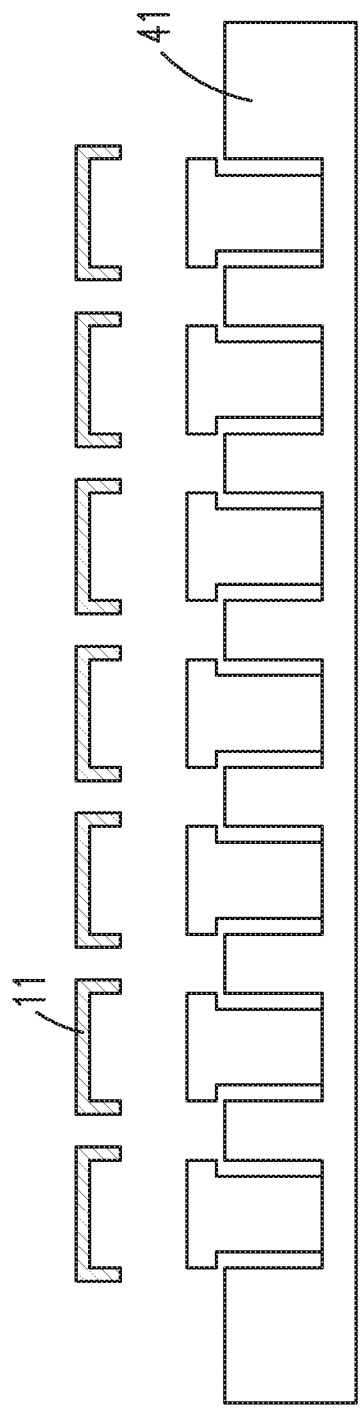
FIG. 4 is a schematic diagram of station 1 (where a worker puts the keycap main bodies on a vacuum fixture) of the machine according to the preferred embodiment of the present invention.

FIG. 4 shows a schematic diagram of station 1 (where a worker puts the keycap main bodies on a vacuum fixture) of the machine according to the preferred embodiment of the present invention. As shown in FIG. 4, a worker put the keycap main bodies 11 on a fixture (e.g., a vacuum fixture) 41 when it is at station 1 of workstation A, wherein the vacuum fixture is a bottom die.

Figure 5:
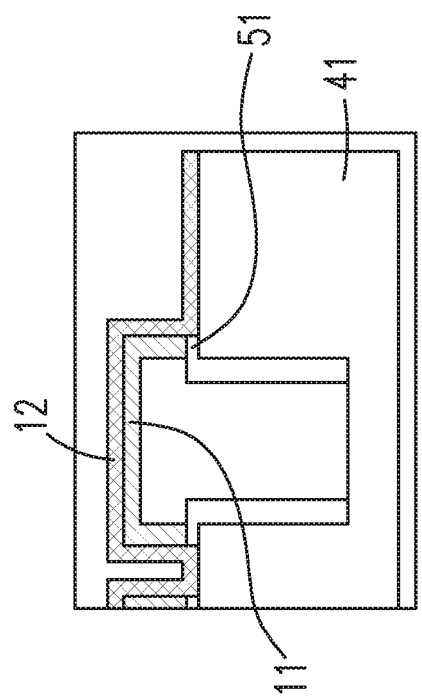
FIG. 5 is a schematic diagram of the vacuum fixture of the machine having an embedded channel for being vacuumized according to the preferred embodiment of the present invention.

FIG. 5 shows a schematic diagram of the vacuum fixture of the machine having an embedded channel for being vacuumized according to the preferred embodiment of the present invention. In FIG. 5, the fixture/vacuum fixture/bottom die 41 has an embedded channel 51 for being vacuumized to attach the cover layer 12 to the plural keycap main bodies 11 even more smoothly with respect to that in the prior art.

Figure 6:
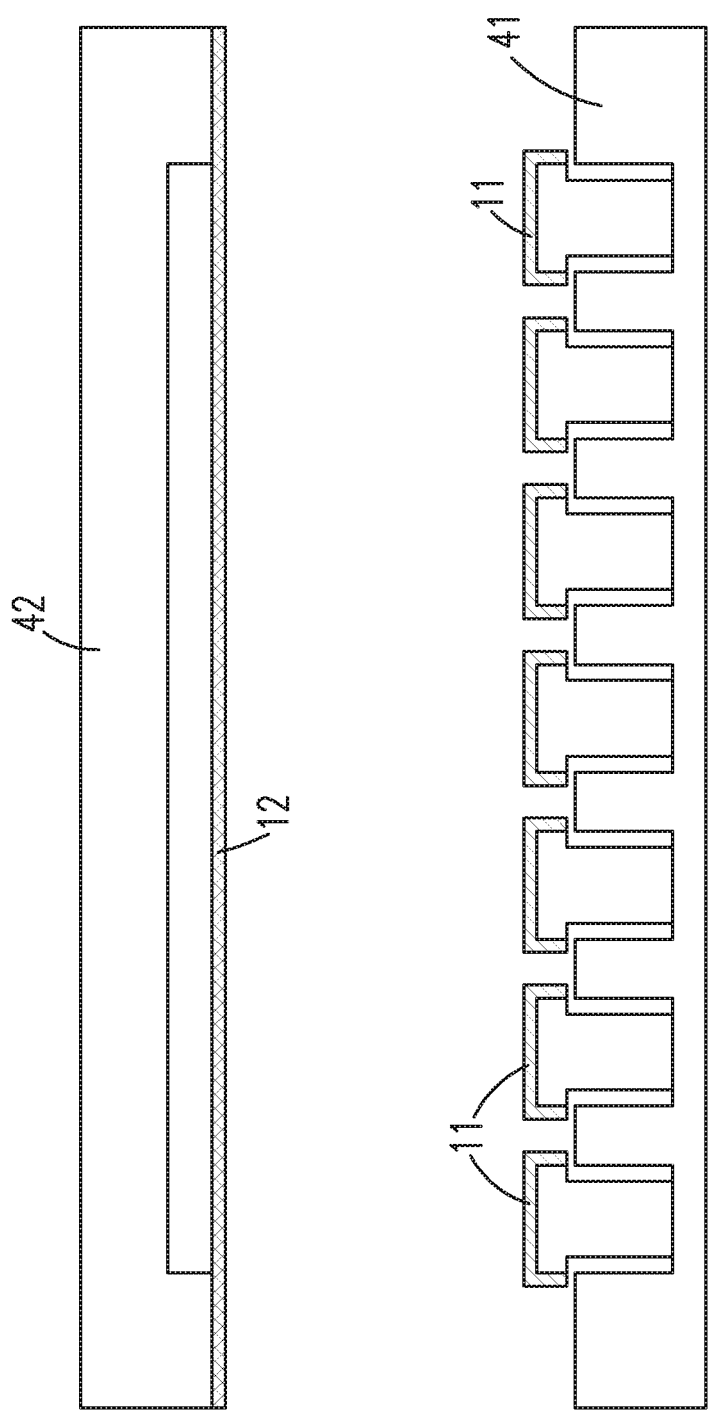
FIG. 6 is a schematic diagram of station 2 (where an upper die automatically sucks a cover layer) of the machine according to the preferred embodiment of the present invention.

FIG. 6 shows a schematic diagram of station 2 (where an upper die automatically sucks a cover layer) of the machine according to the preferred embodiment of the present invention. As shown in FIG. 6, a cover layer 12 is automatically sucked to an upper die 42 when it is at station 2 of workstation B. And, under the upper die 42, the plural keycap main bodies 11 were already put on the vacuum fixture/bottom die 41 by the worker.

Figure 7:
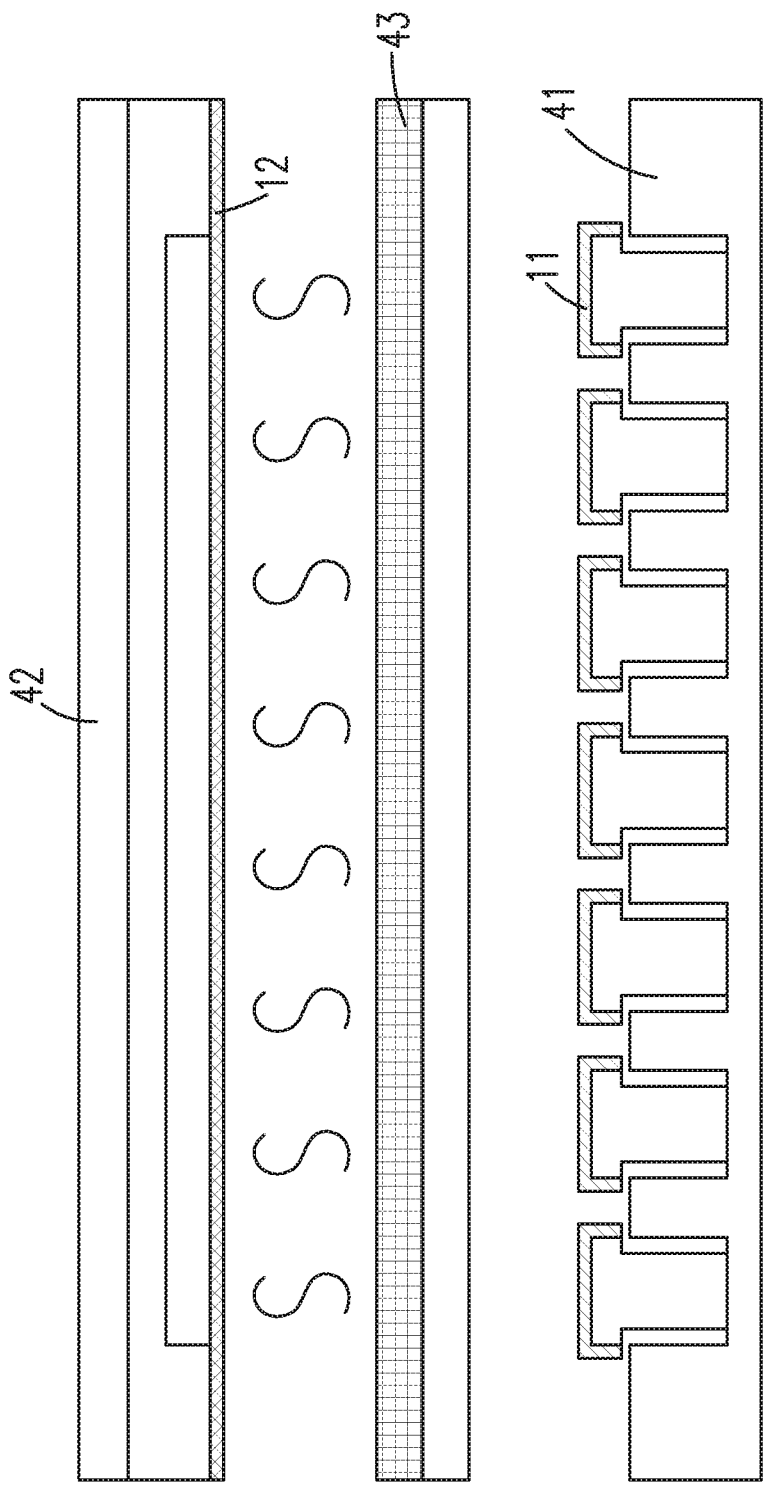
FIG. 7 is a schematic diagram of station 3 (where a heating apparatus moves in to heat the cover layer) of the machine according to the preferred embodiment of the present invention.

FIG. 7 shows a schematic diagram of station 3 (where a heating apparatus moves in to heat the cover layer) of the machine according to the preferred embodiment of the present invention. As shown in FIG. 7, a heating apparatus 43 (e.g., a baking tray) is mounted under the cover layer 12 to heat the cover layer 12 when it is at station 3 of workstation B.

Figure 8:
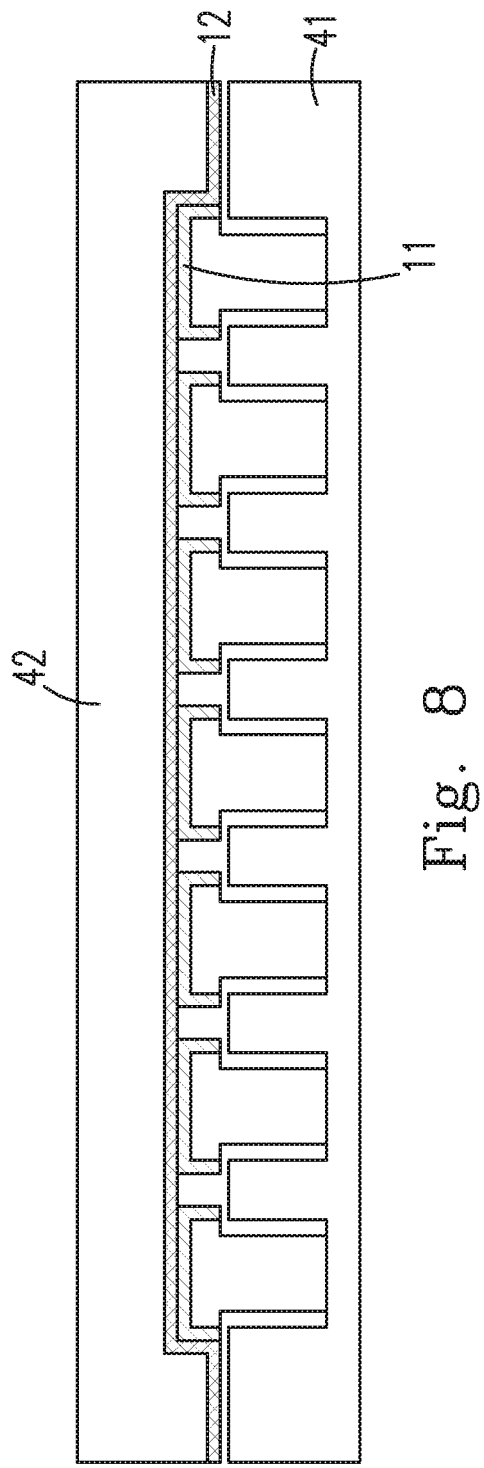
FIG. 8 is a schematic diagram of station 4 (where the upper die and a bottom die are matched to fix the cover layer) of the machine according to the preferred embodiment of the present invention.

FIG. 8 shows a schematic diagram of station 4 (where the upper die and a bottom die are matched to fix the cover layer) of the machine according to the preferred embodiment of the present invention. As shown in FIG. 8, the upper die 42 and the bottom die 41 are matched to fix the cover layer 12 when it is at station 4 of workstation B, wherein the plural keycap main bodies 11 are still put on the vacuum fixture/bottom die 41 at this moment.

Figure 9:
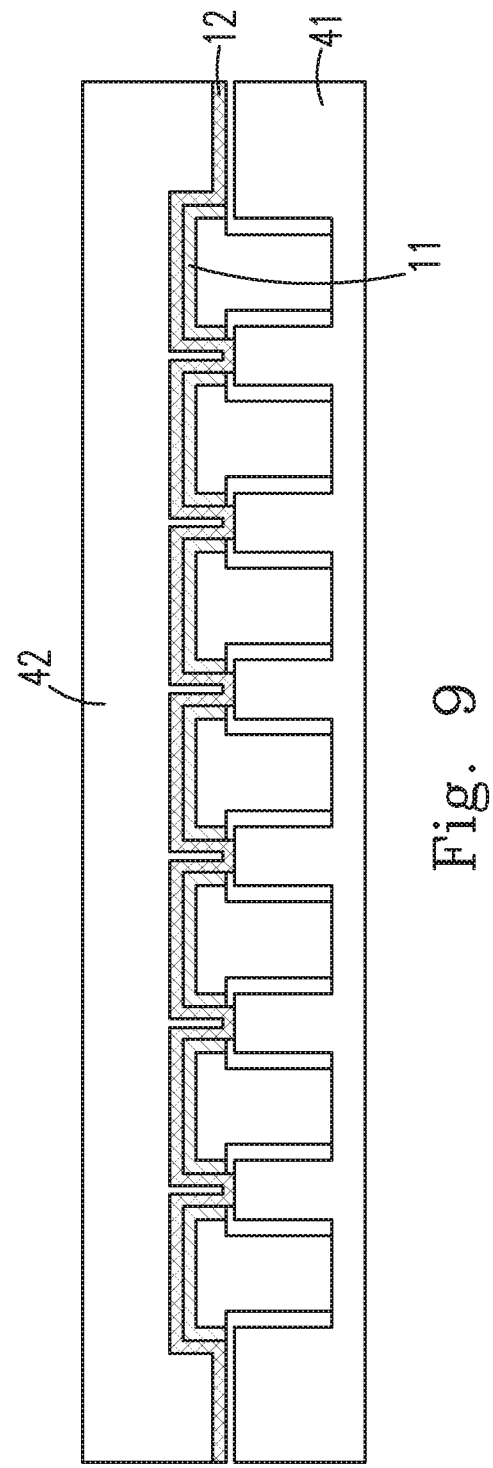
FIG. 9 is a schematic diagram of station 5 (where the bottom die is vacuumized) of the machine according to the preferred embodiment of the present invention.

FIG. 9 shows a schematic diagram of station 5 (where the bottom die is vacuumized) of the machine according to the preferred embodiment of the present invention. As shown in FIG. 9, the fixture/vacuum fixture/bottom die 41 is vacuumized to attach the cover layer 12 to the plural keycap main bodies 11 when it is at station 5 of workstation B, wherein the upper die 42 is still put upon the cover layer 12 at this moment.

Figure 10:
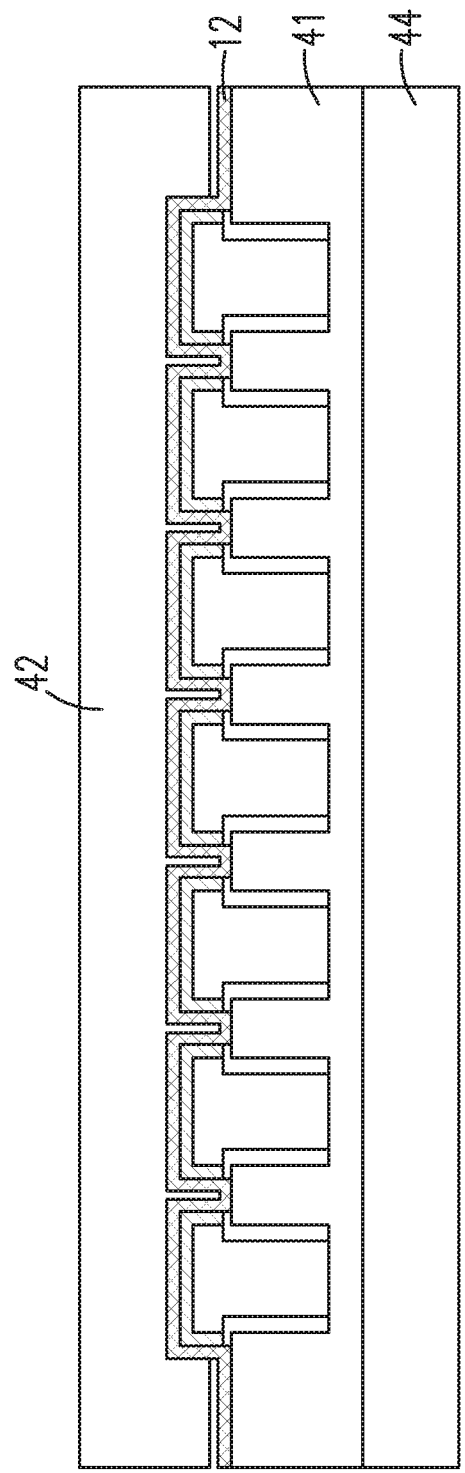
FIG. 10 is a schematic diagram of station 6 (where a cooling frame moves in to lower the temperature) of the machine according to the preferred embodiment of the present invention.

FIG. 10 shows a schematic diagram of station 6 (where a cooling frame moves in to lower the temperature) of the machine according to the preferred embodiment of the present invention. As shown in FIG. 10, the cooling frame 44 is put under and attached to the fixture/vacuum fixture/bottom die 41, the cooling frame 44 enters a cooling mode to cool down and shape the cover layer 12, and causes the cover layer 12 to form the shaped and connected plural units (or subdivisions) lower the temperature when it is at station 6 of workstation B.

Figure 11A:
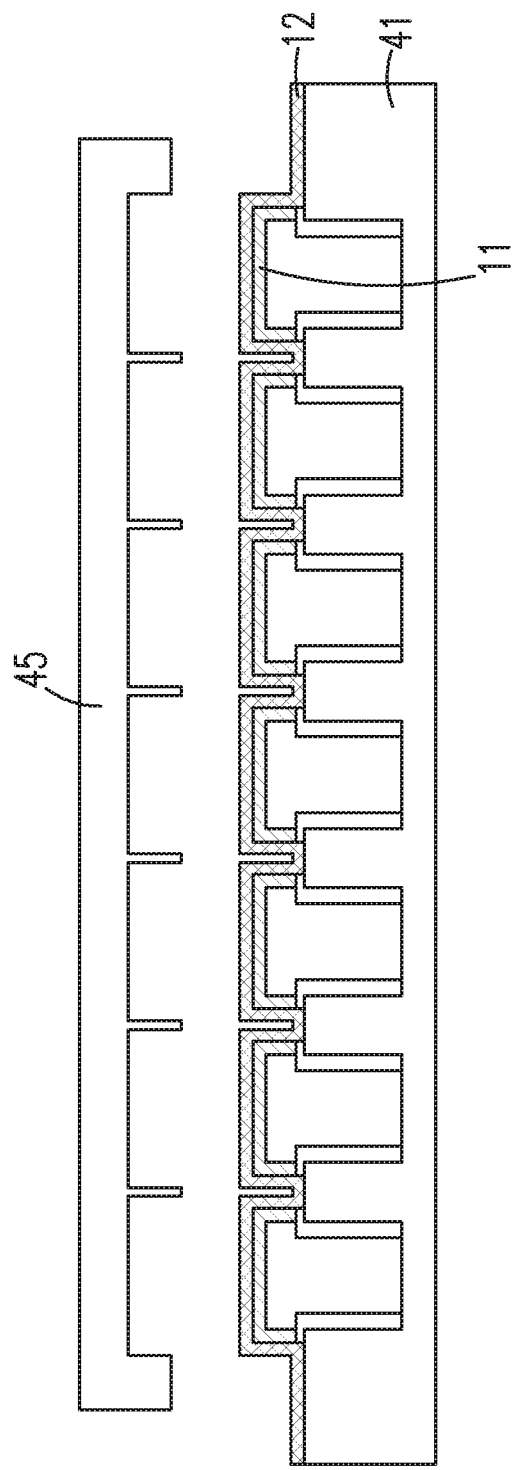
FIGS. 11(a) and 11(b) are respectively schematic diagrams prior and after the cutting of station 7 (where a cutting die is used to cut off the unwanted parts of the cover layer) of the machine according to the preferred embodiment of the present invention.
Figure 11B:
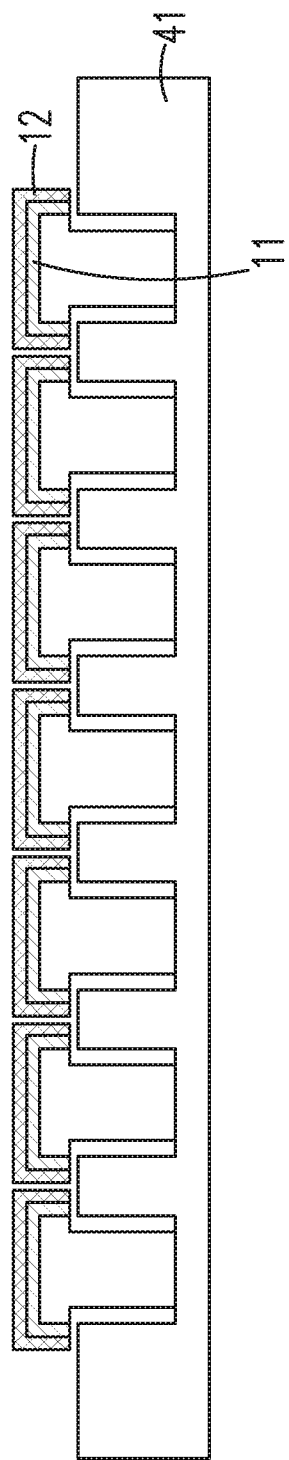

FIGS. 11(a) and 11(b) are respectively schematic diagrams prior and after the cutting of station 7 (where a cutting die is used to cut off the unwanted parts of the cover layer) of the machine according to the preferred embodiment of the present invention. As shown in FIGS. 11(a) and 11(b), the upper die 42 and the cooling frame 44 are removed, and a cutting die 45 is used to cut off the unwanted parts of the cover layer 12 among the plural keycap main bodies 11 after the cover layer 12 is attached to an entire exterior of each the keycap main body 11 when it is at station 7 of workstation C, wherein the plural keycap main bodies 11 are still put on the fixture/vacuum fixture/bottom die 41 at this moment.

Figure 12:
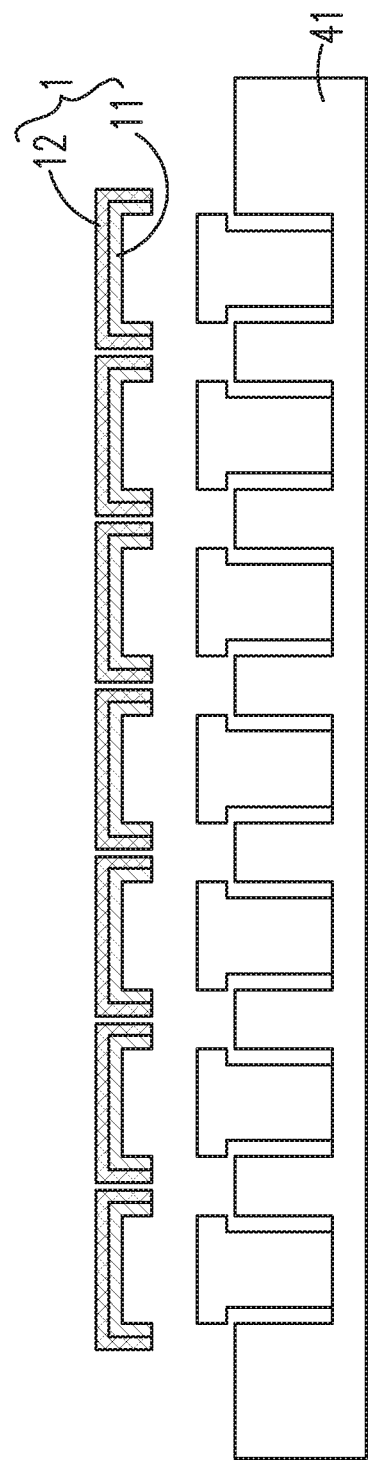
FIG. 12 is a schematic diagram of station 8 (where final products are taken down) of the machine according to the preferred embodiment of the present invention.

FIG. 12 shows a schematic diagram of station 8 (where final products are taken down) of the machine according to the preferred embodiment of the present invention. As shown in FIG. 12, the plural keycap main bodies 11 attached with the corresponding ones of the plural units of the cover layer 12, that is the accomplished plural keycaps 1, are taken down from the fixture/vacuum fixture/bottom die 41 when it is at station 8 of workstation D.

Embodiments

1. A method for manufacturing keycaps of a capped keyboard apparatus, comprising:

(a) providing a cover layer and plural keycap main bodies, wherein the cover layer includes plural units, each the unit has a first surface and a second surface, each the keycap main body has a top surface, and the first surface of each the unit has a character denoting a corresponding keycap;

(b) putting the plural keycap main bodies on a vacuum fixture;

(c) shaping the cover layer on the vacuum fixture and causing the cover layer to be attached to the plural keycap main bodies for attaching the second surface of each the unit to the top surface of a corresponding keycap main body; and (d) cutting the cover layer to obtain plural keycaps respectively attaching thereto the plural units independent of one another.

2. The method according to Embodiment 1, wherein the vacuum fixture has an embedded channel for being vacuumized such that the cover layer fits to the plural keycap main bodies, the vacuum fixture is a bottom die, the step (b) further includes:

(b1) sucking and fixing the cover layer via an upper die; and (b2) heating by a heating apparatus mounted under the sucked cover layer, the step (c) further includes:

(c1) matching the upper die and the bottom die to fix the cover layer;

(c2) vacuumizing the bottom die to attach the cover layer to the plural keycap main bodies;

(c3) setting a cooling frame under the bottom die to cool down and shape the cover layer; and (c4) removing the upper die and the cooling frame, and the step (d) further includes:

(d1) using a cutting die to cut off the unwanted parts of the cover layer among the plural keycap main bodies; and (d2) taking down the manufactured plural keycaps independent of one another from the bottom die.

3. The method according to Embodiment 1 or 2, wherein the cover layer includes a shell fabric layer, a base material layer, a thermoplastic layer and an adhesive layer, the base material layer is configured between the shell fabric layer and the thermoplastic layer, the adhesive layer is configured between each the keycap main body and the thermoplastic layer, each the keycap main body is fully covered by the respective unit and is adhered to the respective unit via the adhesive layer, and the base material layer is an adhesion layer adhering together the shell fabric layer and the thermoplastic layer.

4. The method according to any one of the above-mentioned Embodiments, wherein the thermoplastic layer is shapeable when heated, and shaped when cooled down so as to in turn shape the cover layer, the thermoplastic layer is of a light divergence to adjust a light emission color of a light emitted out from an inner portion of the capped keyboard apparatus, the light is in a status being one selected from a group consisting of being scattered, refracted and reflected due to the light convergence to form a uniform light band, and the light emission color is adjusted due to the light going through the thermoplastic layer and the base material layer.

5. The method according to any one of the above-mentioned Embodiments, wherein the capped keyboard apparatus is used for one of a backlit keyboard and a push-button telephone keyboard, the shell fabric layer is a light shield layer, the base material layer includes a transparent material, a light diffuser and an opaque pigment, the opaque pigment, the transparent material and the light diffuser are mixed in a specific mixing ratio to adjust a color of the character seen by a naked eye, the character is located upon the top surface, the shell fabric layer whose area is vertically corresponding to that of the character is fully removed by a laser carving according to a form of the character such that a light emitted out from an interior of the capped keyboard apparatus penetrates through the character, the opaque pigment and the light diffuser have an effect of light divergence, and the light is in a status being one selected from a group consisting of being scattered, refracted and reflected according to the mixing ratio to form a uniform light band.

6. The method according to any one of the above-mentioned Embodiments, wherein the shell fabric layer is one selected from a group consisting of a leather, a fabric and a leatheroid, the leather has a softness, the fabric is one of a cloth with a base material of knitted fabric and a cloth processed material, and the leatheroid is one selected from a group consisting of a Polyurethane (PU) leather, a Polyvinyl Chloride (PVC) leather, a dry process PU leather of a PU shell fabric combined with a knitted fabric, a wet process PU leather of a PU shell fabric combined with a knitted fabric base, and a leatheroid of a PVC shell fabric combined with a knitted fabric.

7. A method for manufacturing keycaps of a capped keyboard apparatus, comprising:

(a) providing a cover layer and plural keycap main bodies, wherein the cover layer includes plural units, and each the unit has an upper surface with a character;

(b) putting the plural keycap main bodies on a fixture;

(c) shaping the cover layer on the fixture by heating the cover layer first and then cooling the cover layer down, and attaching each the unit to a corresponding one of the plural keycap main bodies; and (d) cutting the cover layer to obtain plural keycaps independent of one another.

8. The method according to Embodiment 7, wherein the fixture is a vacuum fixture and uses an embedded channel for vacuumization such that the cover layer fits to the plural keycap main bodies, the vacuum fixture is a bottom die, the step (b) further includes (b1) sucking and fixing the cover layer via an upper die, the step (c) further includes:

(c1) heating by a heating apparatus mounted under the sucked cover layer;

(c2) matching the upper die and the bottom die to fix the cover layer;

(c3) vacuumizing the bottom die to attach the cover layer to the plural keycap main bodies;

(c4) setting a cooling frame under the bottom die to cool down and shape the cover layer; and (c5) removing the upper die and the cooling frame, and the step (d) further includes:

(d1) using a cutting die to cut off the unwanted parts of the cover layer among the plural keycap main bodies; and (d2) taking down the manufactured plural keycaps independent of one another from the bottom die.

9. A method for manufacturing keycaps of a capped keyboard apparatus, comprising:

(a) providing a cover layer and plural keycap main bodies, wherein the cover layer includes plural units, and each the unit has an upper surface with a character;

(b) putting the plural keycap main bodies on a fixture;

(c) shaping the cover layer on the fixture and attaching each the unit to a corresponding one of the plural keycap main bodies; and (d) cutting the cover layer to obtain plural keycaps independent of one another.

10. The method according to Embodiment 9, wherein the fixture is a vacuum fixture and uses an embedded channel for vacuumization such that the cover layer fits to the plural keycap main bodies, the vacuum fixture is a bottom die, the step (b) further includes:

(b1) sucking and fixing the cover layer via an upper die; and (b2) heating by a heating apparatus mounted under the sucked cover layer, the step (c) further includes:

(c1) matching the upper die and the bottom die to fix the cover layer;

(c2) vacuumizing the bottom die to attach the cover layer to the plural keycap main bodies;

(c3) setting a cooling frame under the bottom die to cool down and shape the cover layer; and (c4) removing the upper die and the cooling frame, and the step (d) further includes:

(d1) using a cutting die to cut off the unwanted parts of the cover layer among the plural keycap main bodies; and (d2) taking down the manufactured plural keycaps independent of one another from the bottom die.

According to the descriptions above, the present invention discloses a method for manufacturing keycaps of a capped keyboard apparatus with each of the plural keycaps configured on the keyboard having a relatively better texture and appearance than that of the keyboard apparatus in the prior art, and the relative manufacturing costs of the proposed keyboard is relatively lower than that of the backlit keyboard in the prior art because no baking varnish is required, the relative manufacturing time of the proposed keyboard is shorter than that of the backlit keyboard in the prior art, and a light emitted out from the character of the proposed keyboard is uniformly distributed, and thus has non-obviousness and novelty.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

What is claimed is:

1. A method for manufacturing keycaps of a capped keyboard apparatus, comprising:

(a) providing a cover layer and plural keycap main bodies, wherein the cover layer includes plural units, each the unit has a first surface and a second surface, each the keycap main body has a top surface, and the first surface of each the unit has a character denoting a corresponding keycap;

(b) putting the plural keycap main bodies on a vacuum fixture having an embedded channel for being vacuumized, wherein the vacuum fixture includes plural T-shaped columns, and plural rectangular columns configured interlacedly with the plural T-shaped columns, each T-shaped column and respective adjacent rectangular column or adjacent T-shaped column thereof have a gap therebetween, and the embedded channel is formed by all the gaps;

(c) shaping the cover layer on the vacuum fixture by vacuumizing the vacuum fixture and causing the cover layer to be attached to the plural keycap main bodies for attaching the second surface of each the unit to the top surface of a corresponding keycap main body; and (d) cutting the cover layer to obtain plural keycaps respectively attaching thereto the plural units independent of one another.

2. The method according to claim 1, wherein the vacuum fixture is a bottom die and the step (b) further includes:

(b1) sucking and fixing the cover layer via an upper die; and (b2) heating by a heating apparatus mounted under the sucked cover layer, the step (c) further includes:

(c1) matching the upper die and the bottom die to fix the cover layer;

(c2) setting a cooling frame under the bottom die to cool down and shape the cover layer; and (c3) removing the upper die and the cooling frame, and the step (d) further includes:

(d1) using a cutting die to cut off the unwanted parts of the cover layer among the plural keycap main bodies; and (d2) taking down the manufactured plural keycaps independent of one another from the bottom die.

3. The method according to claim 1, wherein the cover layer includes a shell fabric layer, a base material layer, a thermoplastic layer and an adhesive layer, the base material layer is configured between the shell fabric layer and the thermoplastic layer, the adhesive layer is configured between each the keycap main body and the thermoplastic layer, each the keycap main body is fully covered by the respective unit and is adhered to the respective unit via the adhesive layer, and the base material layer is an adhesion layer adhering together the shell fabric layer and the thermoplastic layer.

4. The method according to claim 3, wherein the thermoplastic layer is shapeable when heated, and shaped when cooled down so as to in turn shape the cover layer, the thermoplastic layer is of a light divergence to adjust a light emission color of a light emitted out from an inner portion of the capped keyboard apparatus, the light is in a status being one selected from a group consisting of being scattered, refracted and reflected due to the light convergence to form a uniform light band, and the light emission color is adjusted due to the light going through the thermoplastic layer and the base material layer.

5. The method according to claim 3, wherein the capped keyboard apparatus is used for one of a backlit keyboard and a push-button telephone keyboard, the shell fabric layer is a light shield layer, the base material layer includes a transparent material, a light diffuser and an opaque pigment, the opaque pigment, the transparent material and the light diffuser are mixed in a specific mixing ratio to adjust a color of the character seen by a naked eye, the character is located upon the top surface, the shell fabric layer whose area is vertically corresponding to that of the character is fully removed by a laser carving according to a form of the character such that a light emitted out from an interior of the capped keyboard apparatus penetrates through the character, the opaque pigment and the light diffuser have an effect of light divergence, and the light is in a status being one selected from a group consisting of being scattered, refracted and reflected according to the mixing ratio to form a uniform light band.

6. The method according to claim 5, wherein the shell fabric layer is one selected from a group consisting of a leather, a fabric and a leatheroid, the leather has a softness, the fabric is one of a cloth with a base material of knitted fabric and a cloth processed material, and the leatheroid is one selected from a group consisting of a Polyurethane (PU) leather, a Polyvinyl Chloride (PVC) leather, a dry process PU leather of a PU shell fabric combined with a knitted fabric, a wet process PU leather of a PU shell fabric combined with a knitted fabric base, and a leatheroid of a PVC shell fabric combined with a knitted fabric.

7. A method for manufacturing keycaps of a capped keyboard apparatus, comprising:
(a) providing a cover layer and plural keycap main bodies, wherein the cover layer includes plural units, and each the unit has an upper surface with a character;
(b) putting the plural keycap main bodies on a fixture using an embedded channel for vacuumization, wherein the vacuum fixture includes plural T-shaped columns, and plural rectangular columns configured interlacedly with the plural T-shaped columns, each T-shaped column and respective adjacent rectangular column or adjacent T-shaped column thereof have a gap therebetween, and the embedded channel is formed by all the gaps;
(c) shaping the cover layer on the fixture by heating the cover layer, vacuumizing the fixture, cooling the cover layer down, and attaching each the unit to a corresponding one of the plural keycap main bodies; and
(d) cutting the cover layer to obtain plural keycaps independent of one another.

8. The method according to claim 7, wherein the fixture is a vacuum fixture, the vacuum fixture is a bottom die, the step (b) further includes (b1) sucking and fixing the cover layer via an upper die, the step (c) further includes:
(c1) heating by a heating apparatus mounted under the sucked cover layer;
(c2) matching the upper die and the bottom die to fix the cover layer;
(c3) setting a cooling frame under the bottom die to cool down and shape the cover layer; and
(c4) removing the upper die and the cooling frame, and the step (d) further includes:
(d1) using a cutting die to cut off the unwanted parts of the cover layer among the plural keycap main bodies; and
(d2) taking down the manufactured plural keycaps independent of one another from the bottom die.

9. A method for manufacturing keycaps of a capped keyboard apparatus, comprising:
(a) providing a cover layer and plural keycap main bodies, wherein the cover layer includes plural units, and each the unit has an upper surface with a character;
(b) putting the plural keycap main bodies on a fixture using an embedded channel for vacuumization, wherein the vacuum fixture includes plural T-shaped columns, and plural rectangular columns configured interlacedly with the plural T-shaped columns, each T-shaped column and respective adjacent rectangular column or adjacent T-shaped column thereof have a gap therebetween, and the embedded channel is formed by all the gaps;
(c) shaping the cover layer on the fixture by vacuumizing the fixture and attaching each the unit to a corresponding one of the plural keycap main bodies; and
(d) cutting the cover layer to obtain plural keycaps independent of one another.

10. The method according to claim 9, wherein the fixture is a vacuum fixture, the vacuum fixture is a bottom die, the step (b) further includes:
(b1) sucking and fixing the cover layer via an upper die; and
(b2) heating by a heating apparatus mounted under the sucked cover layer, the step (c) further includes:
(c1) matching the upper die and the bottom die to fix the cover layer;
(c2) setting a cooling frame under the bottom die to cool down and shape the cover layer; and
(c3) removing the upper die and the cooling frame, and the step (d) further includes:
(d1) using a cutting die to cut off the unwanted parts of the cover layer among the plural keycap main bodies; and
(d2) taking down the manufactured plural keycaps independent of one another from the bottom die.

* * * * *